United States Patent [19]

Leeman et al.

[11] 4,305,662

[45] Dec. 15, 1981

[54] SAMPLE EXCITATION SITUS ENHANCEMENT APPARATUS FOR A SPECTROMETER

[75] Inventors: John Leeman, Andover; Karl J. Hildebrand, Tyngsboro, both of Mass.

[73] Assignee: Leeman Labs, Inc., Tewksbury, Mass.

[21] Appl. No.: 141,941

[22] Filed: Apr. 21, 1980

[51] Int. Cl.³ .................... G01J 3/02; G01N 21/62
[52] U.S. Cl. ............................ 356/311; 356/326
[58] Field of Search ............ 356/311, 313–316, 356/417, 328, 334, 326

[56] References Cited

U.S. PATENT DOCUMENTS

| 3,489,498 | 1/1970 | Brody et al. | 356/417 |
| 3,554,649 | 1/1971 | Ridgway | 356/334 |

FOREIGN PATENT DOCUMENTS

| 2002921 | 2/1979 | United Kingdom | 356/328 |

*Primary Examiner*—F. L. Evans
*Attorney, Agent, or Firm*—John M. Brandt

[57] ABSTRACT

A sample excitation situs or light source enhancement apparatus for an optical spectrometer comprising a mirror arranged to reflect an image of the excitation situs in close proximity to the actual excitation situs is disclosed.

5 Claims, 4 Drawing Figures

SAMPLE EXCITATION SITUS ENHANCEMENT APPARATUS FOR A SPECTROMETER

BACKGROUND OF THE INVENTION

1. Field of the Invention

The invention resides in the field of optical spectrometers and more particularly relates to apparatus for producing, augmenting and enhancing the sample excitation situs or light source to be analyzed by those spectrometers.

2. Description of the Prior Art

Direct current arcs, plasmas, flames and other means of sample atomic excitation are commonly used for the purpose of spectral analysis. In many cases, these light or excitation sources are used in multi-element analysis systems, i.e., systems where the presence of more than one element is detected at a single time. One of the difficulties encountered in these systems relates to the spatial separation within the light source region of emissions from atomic transitions of varying excitation energy. In general, these will be separated according to the spatial temperature profile of the excitation source employed, the highest temperatures yielding the highest energies. As a result, information anomalies can occur when a variety of elements are present with excitation profiles which overlap. This often requires a difficult compromise when selecting which area of the situs or source to focus on the input aperture of the analyzing spectrometer.

In the invention described herein, the sample excitation situs or light source may be focused on the spectrometer input aperture in the conventional manner using a lens or mirror. In addition, a mirror is placed on the opposite side of the excitation situs from the spectrometer aperture such that an image of the excitation situs is reflected in close proximity upon itself. The mirror may be arranged to reverse the image yielding the reverse of the temperature, and therefore excitation energy profile, resulting in an effective averaging and enhancement of the intensity profile.

Additionally, this image may be shifted along the vertical or longitudinal axis of the original situs in order to emphasize one region of the source or another. Further, by positioning the image in front of or in back of the central plane of the situs, it is possible to compensate for the chromatic effects of any lenses which may be used to focus the source on the spectrometer aperture.

An additional advantage of this procedure of imaging is a substantial increase in the energy input into the spectrometer.

The inventor knows of no other apparatus or arrangement disclosed in the prior art which will accomplish the purposes and advantages of the invention as described above.

SUMMARY OF THE INVENTION

The invention may be summarized as a spectrometer sample excitation situs or light source augmentation and enhancement apparatus comprising a mirror arranged to produce an image of the source in close proximity to itself to provide a source having an altered spatial temperature profile to a spectrometer input aperture.

The apparatus provides the means to adjust the spatial temperature profile which is presented to the spectrometer input aperture by inverting the image such that the combined source and image profiles are spatially smoothed or averaged. Additionally, the input energy to the spectrometer is enhanced by the recapture of otherwise lost radiation. Further, the image may be focused in front or back of the situs focal plane as well as displaced along the longitudinal axis of the situs in the central plane to provide aberration correction and averaging adjustment.

These features and objects of the invention will become more clear from the description of the preferred embodiment and drawings which follow.

DESCRIPTION OF THE PREFERRED EMBODIMENT

Figure 1:
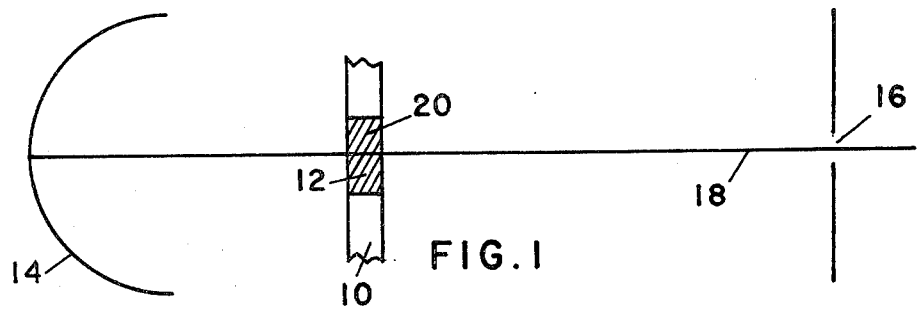
FIG. 1 is a diagrammatic illustration of the preferred embodiment of the invention.

Referring first to FIG. 1, there is shown in diagrammatic form an illustration of the preferred embodiment of the invention. A spectrometer sample excitation situs or light source, a plasma jet for example, is shown at 10. The region of greatest excitation and therefore of most interest is indicated at 12. As discussed above, this region will have a varying spatial energy profile along the longitudinal axis. A spherical concave mirror 14 is positioned behind source 10 and spectrometer entrance aperture 16. Line 18 defines the optical axis of the apparatus in this and the additional figures.

Mirror 14 is positioned a distance from the excitation situs twice its focal length and it is arranged such that its optical axis divides the situs. Under these circumstances, the central plane of the situs is located exactly at the center of revolution of the mirror and an inverted image of the situs 20, shown shaded, exactly overlaps the situs itself.

The complete source presented to aperture 16 is therefore a combination of image and original source smoothed or averaged out by the image inversion. As a result, the input intensity is greatly increased and spatial variations in the excitation energy profile are, to a large extent, eliminated.

Figure 2:
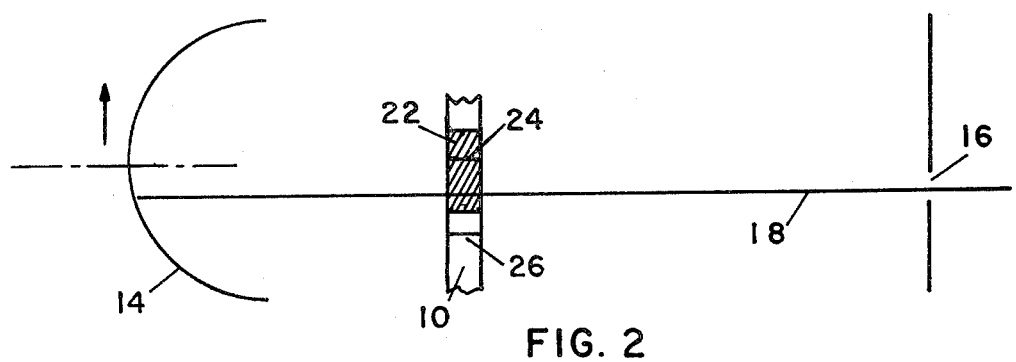
FIG. 2 is an additional diagrammatic illustration of the apparatus of FIG. 1.

Referring to FIG. 2, the mirror is moved vertically off axis 18 resulting in a shifting and expansion of the situs in its own plane along its vertical axis. The image 22 is shown shaded and the original situs is bounded at 24 and 26. The partial overlap shown allows a portion of the source to be augmented and emphasized when required by the overall spectrometer design and configuration.

Figure 3:
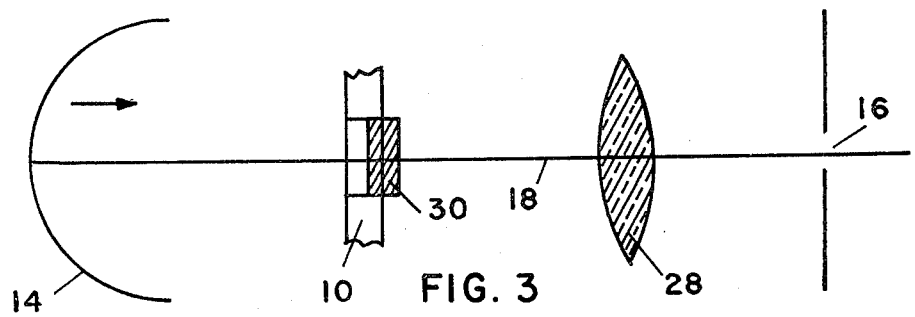
FIG. 3 is another diagrammatic illustration of the apparatus of FIG. 1.
Figure 4:
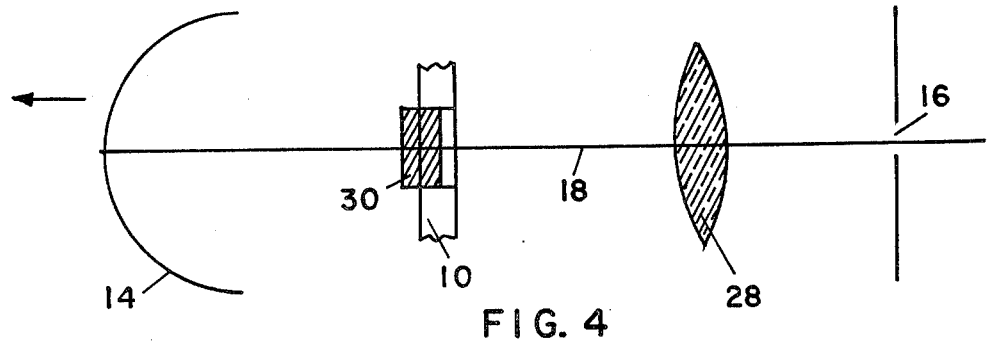
FIG. 4 is a further diagrammatic illustration of the apparatus of FIG. 1.

FIGS. 3 and 4 illustrate a shifting of the image to either side of the situs plane to compensate for chromatic aberration which may be present in lens 28. The lens is used to focus the source on the aperture 16 which may, due to chromatic aberration, result in a portion of the source image being spread out or displaced along axis 18 at the aperture. Shifting the image will, in whole or in part, provide a suitable correction for this optically induced error.

By moving the mirror horizontally toward the aperture, the source image is reflected forward of the situs plane as shown in FIG. 3. By moving the mirror horizontally away from the aperture, the source image is reflected rearward of the situs plane as shown in FIG. 4. In both cases, the image is shown shaded at 30. The amount and direction of shift will depend upon the amount of correction required by the aberration of the lens.

As will be obvious, the specific situs and situs image integrations illustrated above may be combined to adjust the total source presented to the input aperture in a variety of ways. The final pattern of enhancement and augmentation produced by the apparatus will depend upon the nature of the light source and requirements of the spectrometric device in which it is employed. Accordingly, the invention is defined by the following claims.

What is claimed is:

1. The method for modifying the spatial temperature profile of the radiation emanating from a sample excitation situs of a spectrometer comprising in combination the steps of:
   a. providing sample excitation means at a situs substantially coincident with the optical input situs of said spectrometer;
   b. providing mirror means opposite said excitation situs and opposite the input aperture of said spectrometer;
   c. supplying a sample for analysis to said excitation means;
   d. exciting said sample to emit radiant energy; and
   e. reflecting an image of said excitation situs from said mirror back upon said situs, said image and said situs at least partially overlapping one another.

2. The method of claim 1 wherein said reflected image is an inverted image.

3. The method of compensating for the chromatic aberration of an excitation situs focusing lens in a spectrometer comprising in combination the steps of:
   a. providing sample excitation means at a situs substantially coincident with the optical input situs of said spectrometer;
   b. providing mirror means opposite said excitation situs and opposite the input aperture of said spectrometer;
   c. providing lens means for imaging said excitation situs at said aperture;
   d. supplying a sample for analysis to said excitation means;
   e. exciting said sample to emit radiant energy; and
   f. reflecting an image of said excitation situs back toward said situs in a plane other than that of said situs.

4. The method of claim 3 wherein at least a portion of said image is reflected between said excitation situs and said lens.

5. The method of claim 3 wherein at least a portion of said image is reflected between said mirror and said excitation situs.

* * * * *